US008390919B2

(12) United States Patent
Yi et al.

(10) Patent No.: US 8,390,919 B2
(45) Date of Patent: Mar. 5, 2013

(54) ELECTRONIC PAPER DISPLAY DEVICE AND MANUFACTURING METHOD THEREOF

(75) Inventors: Jong Su Yi, Gyunggi-do (KR); Hye Yeon Cha, Gyunggi-do (KR); Hwan-Soo Lee, Seoul (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 280 days.

(21) Appl. No.: 12/963,116

(22) Filed: Dec. 8, 2010

(65) Prior Publication Data

US 2011/0210909 A1    Sep. 1, 2011

(30) Foreign Application Priority Data

Feb. 26, 2010 (KR) .................. 10-2010-0018160

(51) Int. Cl.
*G02B 26/00* (2006.01)

(52) U.S. Cl. ........................................ 359/296
(58) Field of Classification Search ............. 359/296
See application file for complete search history.

(56) References Cited

U.S. PATENT DOCUMENTS

| 4,126,854 A | 11/1978 | Sheridon |
| 5,777,782 A | 7/1998 | Sheridon |
| 6,462,859 B1 | 10/2002 | Bastiaens et al. |
| 8,049,954 B2 * | 11/2011 | Lipovetskaya et al. ........ 359/296 |
| 8,068,271 B2 * | 11/2011 | Lipovetskaya et al. ........ 359/296 |
| 8,159,741 B2 * | 4/2012 | Lee et al. ........................ 359/296 |

FOREIGN PATENT DOCUMENTS

| JP | 2004-157566 | 6/2004 |
| JP | 2007-286190 | 11/2007 |
| KR | 2003-0038789 A | 5/2003 |
| KR | 10-0662198 B1 | 12/2006 |

OTHER PUBLICATIONS

Korean Office Action, with English Translation, issued in Korean Patent Application No. 10-2010-0018160, dated Jun. 30, 2011.

* cited by examiner

*Primary Examiner* — David N Spector
(74) *Attorney, Agent, or Firm* — McDermott Will & Emery LLP

(57) ABSTRACT

There is provided an electronic paper display device and a manufacturing method thereof. The electronic paper display device includes first and second electrodes facing each other with a predetermined gap therebetween; partitions dividing a space between the first and second electrodes into a plurality of cell spaces; first and second ridge portions formed on the first and second electrodes and allowing for a streamlined electric field in the cell spaces; and rotatable balls disposed in the respective cell spaces and having electrical and optical anisotropy. The electronic paper display device controls the linear movement of the rotatable ball through a streamlined electric field, and thus the stability of an image is achieved, and a superior contrast ratio is provided.

11 Claims, 3 Drawing Sheets

ELECTRONIC PAPER DISPLAY DEVICE AND MANUFACTURING METHOD THEREOF

CROSS-REFERENCE TO RELATED APPLICATIONS

This application claims the priority of Korean Patent Application No. 10-2010-0018160 filed on Feb. 26, 2010, in the Korean Intellectual Property Office, the disclosure of which is incorporated herein by reference.

BACKGROUND OF THE INVENTION

1. Field of the Invention

The present invention relates to an electronic paper display device and a manufacturing method thereof, and more particularly, to an electronic paper display device allowing for the stability of an image and having a superior contrast ratio and a manufacturing method thereof.

2. Description of the Related Art

In recent years, changes in the way information is transferred and shared have been required to keep pace with an information society in which a new paradigm is required. In order to satisfy such a requirement, the development of electronic paper capable of being bent as a flexible display has been accelerated, and thus the technological development of electronic paper is now entering a commercially viable stage.

In comparison with an existing flat display panel, electronic paper offers lower manufacturing costs and superior energy efficiency in view of the fact that since electronic paper does not require background lighting or constant recharging, it can be driven even with very little energy. Also, electronic paper is very vivid and has a wide viewing angle. Moreover, electronic paper has a memory function allowing for the retention of characters even without power. These advantages allow for a wide range of electronic paper applications, such as an electronic book having a paper-like appearance and including moving illustrations, a renewable newspaper, a reusable paper display for a mobile phone, a disposable TV screen, or electronic wallpaper. Electronic paper therefore has huge market potential.

Proposed technical methods for the realization of electronic paper are divided into four approaches: a twist ball method allowing for the rotation of spherical particles having oppositely electrically charged upper and lower hemispheres of different colors by using an electric field; an electrophoretic method of keeping charged pigment particles mixed with oil in a microcapsule or a microcup and applying an electric field thereto or allowing charged particles to respond to the application of an electric field; a Quick Response-Liquid Powder Display (QR-LPD) method using a charged liquid powder; or a Cholesteric-Liquid Crystal Display (Ch-LCD) method using the selective reflection of cholesteric liquid crystal molecules.

According to the twist ball method, a cell is filled with a transparent medium, and a twist ball having opposite electric charges and different colors, for example, a twist ball hemispherically colored black and white is disposed in the transparent medium. When voltage is applied to the twist ball, the twist ball rotates such that the hemisphere having a polarity opposite to that of the applied voltage is positioned toward the front side of a display according to direction of the applied voltage, and thus black or white can be displayed.

SUMMARY OF THE INVENTION

An aspect of the present invention provides an electronic paper display device achieving a stable image and a superior contrast ratio by controlling the linear movement of a rotatable ball and a manufacturing method thereof.

According to an aspect of the present invention, there is provided an electronic paper display device including: first and second electrodes facing each other with a predetermined gap therebetween; partitions dividing a space between the first and second electrodes into a plurality of cell spaces; first and second ridge portions formed on the first and second electrodes and allowing for a streamlined electric field in the cell spaces; and rotatable balls disposed in the respective cell spaces and having electrical and optical anisotropy.

At least one of the first and second ridge portions may be formed of the same material as that of the first and second electrodes.

At least one of the first and second ridge portions may be formed of a dielectric material.

The cell spaces may be filled with dielectric liquid, and the dielectric material may have a higher dielectric constant than that of the dielectric liquid.

At least one of the first and second ridge portions may have a shape of a horn or a pillar.

The rotatable balls may be differently colored and include two display areas having different electrical charge properties.

The rotatable balls may have a shape of a sphere, an oval-shaped sphere or a cylinder.

According to another aspect of the present invention, there is provided a method of manufacturing an electronic paper display device, the method including: preparing a first electrode having a first ridge portion; forming partitions dividing a space on the first electrode into a plurality of cell spaces; disposing rotatable balls in the respective cell spaces, the rotatable balls having electrical and optical anisotropy; and attaching a second electrode having a second ridge portion to be disposed to face the first electrode and cover the cell spaces.

At least one of the first and second ridge portions may be formed of the same material as that of the first and second electrodes.

At least one of the first and second ridge portions may be formed of a dielectric material.

At least one of the first and second ridge portions may have a shape of a horn or a pillar.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
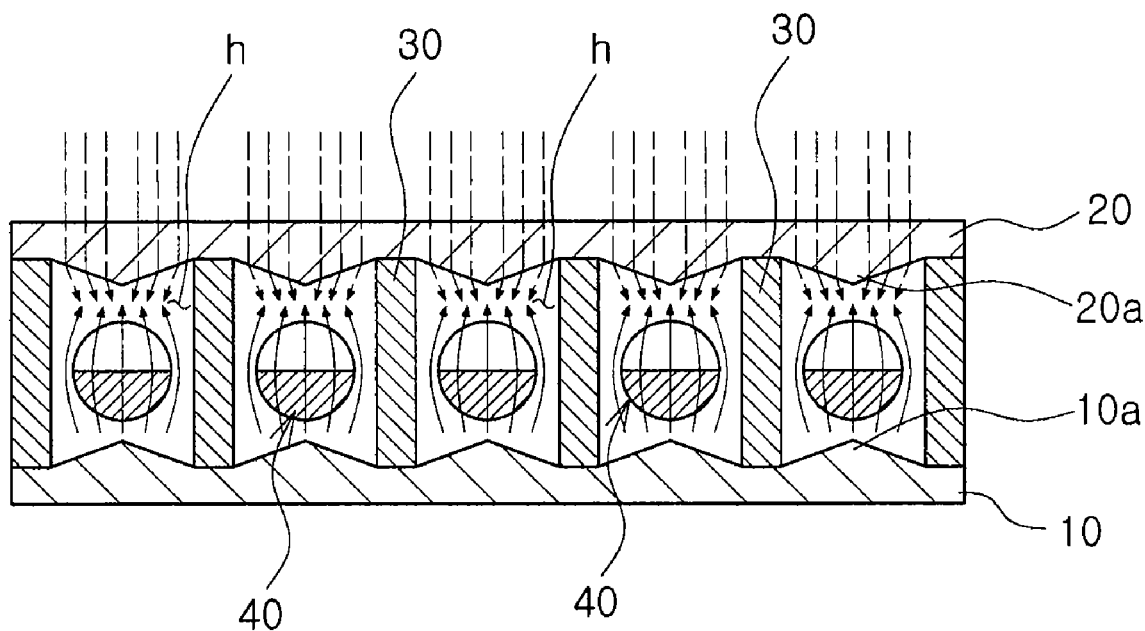
FIG. 1 is a schematic cross-sectional view illustrating an electronic paper display device according to an exemplary embodiment of the present invention.

Exemplary embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions may be exaggerated for clarity, and the same reference numerals will be used throughout to designate the same or like elements.

FIG. 1 is a schematic cross-sectional view illustrating an electronic paper display device according to an exemplary embodiment of the present invention. With reference to FIG. 1, an electronic paper display device according to the present embodiment includes a first electrode 10 disposed in the lower part thereof and a second electrode 20 disposed to face the first electrode 10 with a predetermined gap therebetween. A plurality of partitions 30 are formed between the first and second electrodes 10 and 20 in a manner such that the partitions 30 divide the space between the first and second electrodes 10 and 20 into a plurality of cell spaces h. Each cell space h has a rotatable ball 40 having electrical and optical anisotropy disposed therein.

The first and second electrodes 10 and 20 are used to apply voltage to the rotatable ball 40.

The first and second electrodes 10 and 20 may be formed of a conductive material, and electrode materials known in the art to which the invention pertains may be used therefor. For example, a conductive polymer such as polythiophene (PT) or polyaniline (PANI), metal particles such as silver or nickel, a polymer film including the metal particles, Indium-Tin-Oxide (ITO), or the like may be used therefor. Also, the second electrode 20 may be provided as a display surface. In order to be a display surface, the second electrode 20 may be formed of a light-transmitting material.

The plurality of partitions 30 are formed in the space between the first and second electrodes 10 and 20. The partitions 30 divide the space between the first and second electrodes 10 and 20 into the plurality of cell spaces h. In this description, the spaces between the partitions are defined as "cell spaces."

A material for the partitions 30 is not particularly limited so long as it has flexibility. A thermosetting resin or a UV-curable resin may be used therefor.

For example, polyethylene terephthalate (PET), polycarbonate (PC), polymethylmethacrylate (PMMA), polyethylenenaphthalate (PEN), Polyethersulfone (PES), cycloolefin copolymer (COC), polydimethylsiloxane (PDMS), or poly urethane acrylate (PUA) may be used therefor.

Each of the cell spaces h has the rotatable ball 40 having electrical and optical anisotropy disposed therein. Also, the cell space may be filled with dielectric liquid in order to facilitate the rotation of the rotatable ball.

Figure 2:
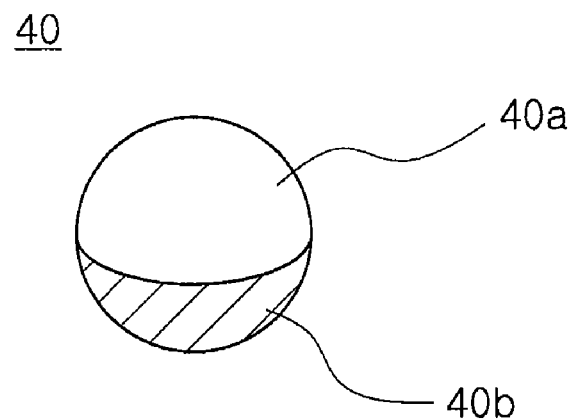
FIG. 2 is a schematic perspective view illustrating an enlarged rotatable ball according to an exemplary embodiment of the present invention.

FIG. 2 is a schematic perspective view illustrating an enlarged rotatable ball. With reference to FIG. 2, the rotatable ball 40 has two display areas 40a and 40b having different colors and different electrical charge properties. The two display areas 40a and 40b may be differently colored in such a manner that a first display area 40a may be colored white and a second display area 40b may be colored black. When the first display area 40a is charged with a positive charge, the second display area 40b is charged with a negative charge. When voltage is applied to the rotatable ball 40, the rotatable ball 40 rotates according to the magnitude and direction of the applied voltage, and thus black or white is displayed due to the coloring on the two display areas 40a and 40b.

In this case, a method known in the art may be used for processing the rotatable ball 40 electrically and optically to form the first and second display areas 40a and 40b. For example, there may be used a method of applying centrifugal force to a rotatable ball provided to a rotatable disk including two coloring liquids.

The shape of the rotatable ball 40 is not particularly limited. For example, the shape thereof may be a sphere, an oval-shaped sphere or a cylinder.

In the present embodiment, the rotatable ball 40 has two display areas formed on the surface thereof. However, the number of display areas may be three or more, if desired.

Also, the display areas may be colored a variety of colors other than black or white.

The first and second electrodes 10 and 20 include ridge portions 10a and 20a protruding inwardly into the cell spaces.

The ridge portions 10a and 20a allow an electric field to be streamlined within the cell space.

In the present embodiment, the first and second electrodes 10 and 20 are formed to protrude into the cell spaces h. The ridge portions 10a and 20a are formed of the same material as that of the first and second electrodes.

Through the first and second electrodes 10 and 20, voltage is applied to the rotatable balls 40. The rotatable balls 40 rotate while allowing charged states to be balanced in a parallel manner according to the direction of the applied voltage, and black or white is displayed accordingly.

That is, the rotatable balls have electrical anisotropy such that they have different electrical charge properties. When voltage is applied to the rotatable balls, the rotatable balls move according to an electric field direction, and an image is produced accordingly.

The movements of the rotatable ball are divided into two types of movements. The first is a rotating movement resulting from a dipolar response to an electric field, in which a dipole is generated since the two display areas of the rotatable ball have different electrical charge properties. Due to the rotating movement, a displayed color and an image displayed on electronic paper may be changed.

The second movement is a linear movement. The rotatable ball performs a linear movement upwardly and downwardly according to an electric field. This is because a monopole is present due to the two display areas of the rotatable ball having different amounts of charge. It is difficult to manufacture a rotatable ball including two display areas having exactly the same amount of charge and formed as hemispheres of the same volume.

Accordingly, the rotatable ball has the monopole. Whenever the electric field direction is changed, the rotatable ball performs the linear movement in addition to the rotating movement.

When the rotatable ball moves closely to the first electrode or the second electrode, an image charge is formed at the center of the electrode. Even in the case that an electric field disappears due to the removal of voltage applied to electronic paper, the image charge acts on the rotatable ball to thereby cause the rotatable ball to remain stationary. Accordingly, the displayed image is maintained until a further electric field is applied.

However, the movements of the rotatable ball may be impaired by structural anisotropy in the manufacturing thereof, external impacts or the like.

When the movements of the rotatable ball are impaired, the rotatable ball may move within the cell space so as to be positioned away from the center thereof. In the case of normal movements, an image charge is formed in the center of each cell space between the first and second electrodes. In the case that the rotatable ball is positioned adjacent to the partition rather than at the center of the cell space due to the impaired movements of the rotatable ball, an image charge may also be formed in the partition. Accordingly, the image charge formed in the partition may be applied to the movements of the rotatable ball.

That is, the movements of the rotatable ball may be incomplete due to impairing factors such as friction, and accordingly, the quality of an image displayed on electronic paper is degraded.

In the present embodiment, a streamlined electric field, rather than a vertical electric field (depicted as a straight line in FIG. 1), is formed to thereby interrupt the rotatable ball from moving toward the partition. In the case that the rotatable ball moves toward the partition, the streamlined electric field causes the rotatable ball to move back toward the center of the cell space. Accordingly, the rotatable ball does not move toward the partition, but performs the linear movement within the center of the cell space, whereby the image charge is not formed in the partition.

As described above, the streamlined electric field is formed due to the ridge portions formed on the first and second electrodes. The ridge portions are not particularly limited so long as they are shaped to protrude inwardly into the cell spaces from the first and second electrodes. For example, the shape thereof may be a horn shape, such as a quadrangular pyramid and a cone, or a pillar shape, such as a cylinder and a prism.

Moreover, the ridge portions formed on the first and second electrodes may contribute to improving the contrast ratio of the electronic paper display device.

The contrast ratio of the electronic paper display device may be degraded because incident light acts on both the rotatable ball and the partition. According to the present invention, however, the angle of incident light (depicted as a dotted line in FIG. 1) is varied due to the ridge portions such that light which would otherwise be incident on the partition can act on the rotatable ball.

Figure 3:
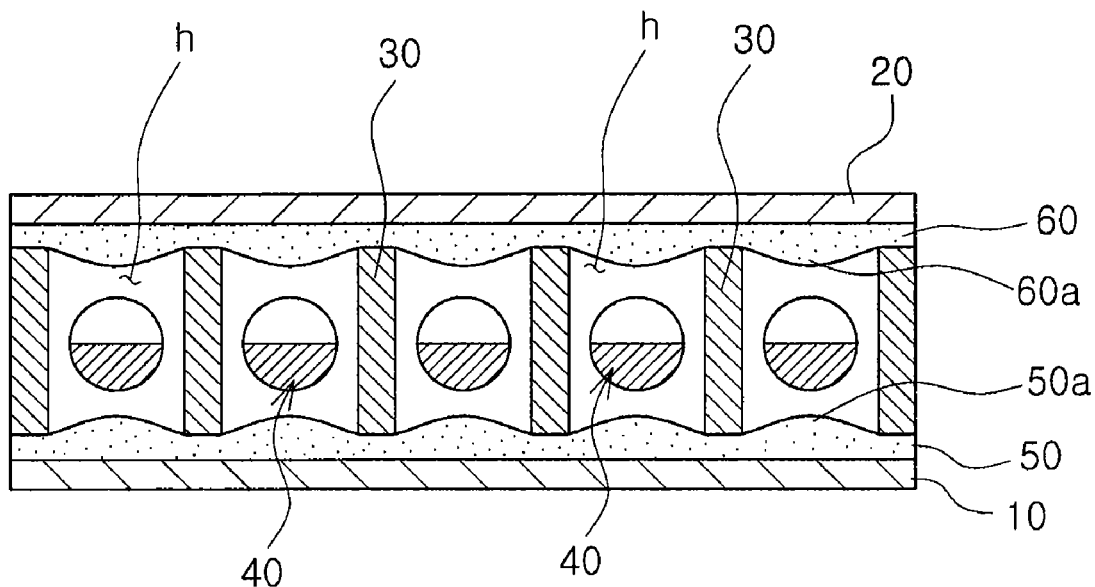
FIG. 3 is a schematic cross-sectional view illustrating an electronic paper display device according to another exemplary embodiment of the present invention.

FIG. 3 is a schematic cross-sectional view illustrating an electronic paper display device according to another exemplary embodiment of the present invention. A detailed description of elements different from those in the aforementioned embodiment will be provided below, and a detailed description of the same elements will be omitted.

With reference to FIG. 3, the electronic paper display device according to the present embodiment includes a first electrode 10 disposed in the lower part thereof and a second electrode 20 disposed to face the first electrode 10 with a predetermined gap therebetween. A plurality of partitions 30 are formed between the first and second electrodes 10 and 20 in a manner such that the partitions 30 divide the space between the first and second electrodes 10 and 20 into the plurality of cell spaces h. Each cell space h has a rotatable ball 40 having electrical and optical anisotropy disposed therein. Also, the cell space h is filled with dielectric liquid such that the rotations of the rotatable ball 40 may be facilitated.

The first and second electrodes 10 and 20 may have first and second dielectric layers 50 and 60 respectively formed thereon. The first and second dielectric layers 50 and 60 may have first and second ridge portions 50a and 60a protruding inwardly into the cell spaces h. The ridge portions 50a and 60a are formed of a dielectric material. The dielectric material is not particularly limited, but it may have a higher dielectric constant than the dielectric liquid filling the cell spaces h. Due to the ridge portions 50a and 60a, the streamlined electric field is formed in the cell spaces h.

Although not shown, the first electrode may be formed in the lower part of the cell space so as to have a ridge portion formed thereon and the second electrode may be formed in the upper part of the cell space so as to have a ridge portion prepared by the use of a dielectric layer.

The first and second ridge portions 50a and 60a cause an electric field to have a streamlined form, and thus the rotatable ball is difficult to move toward the partition. In the case that the rotatable ball moves toward the partition, the streamlined electric field causes the rotatable ball to move back toward the center of the cell space, and thus the rotatable ball does not move toward the partition, but performs the linear movement within the center of the cell space. Accordingly, the image charge is not formed in the partition, and the factor impairing the movements of the rotatable ball is removed, whereby the image displayed on the electronic paper display device is stabilized.

Moreover, as described above, the first and second ridge portions 50a and 60a may contribute to improving the contrast ratio of the electronic paper display device.

Hereinafter, a method of manufacturing an electronic paper display device according to an exemplary embodiment of the invention will be described in detail.

Figure 4A:
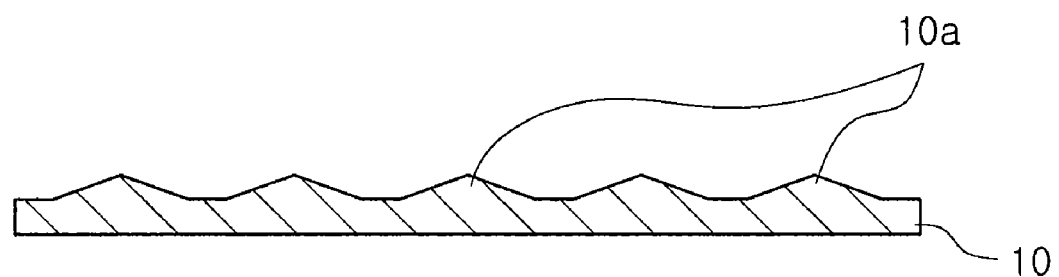
FIGS. 4A through 4C are cross-sectional views illustrating manufacturing processes of an electronic paper display device according to an exemplary embodiment of the present invention.
Figure 4B:
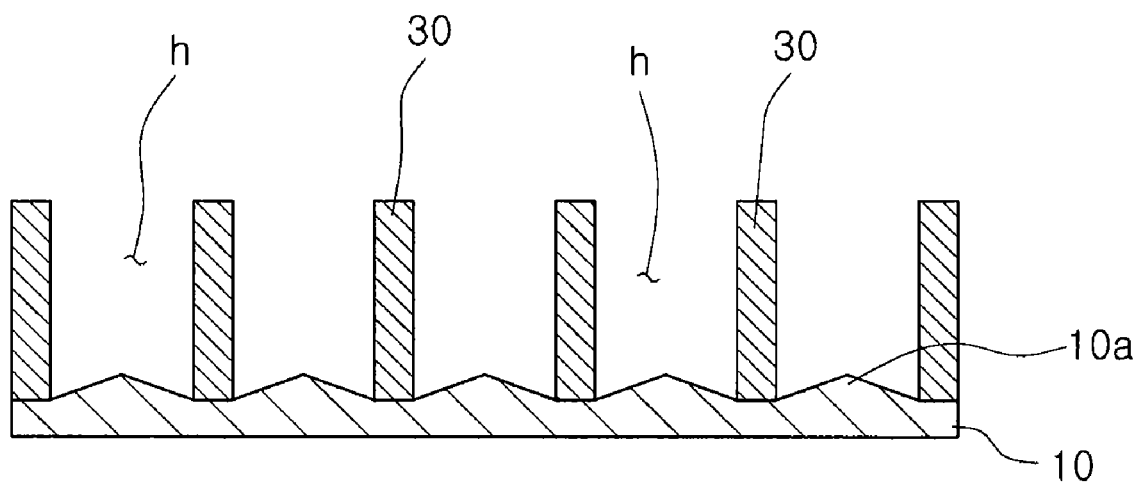
Figure 4C:
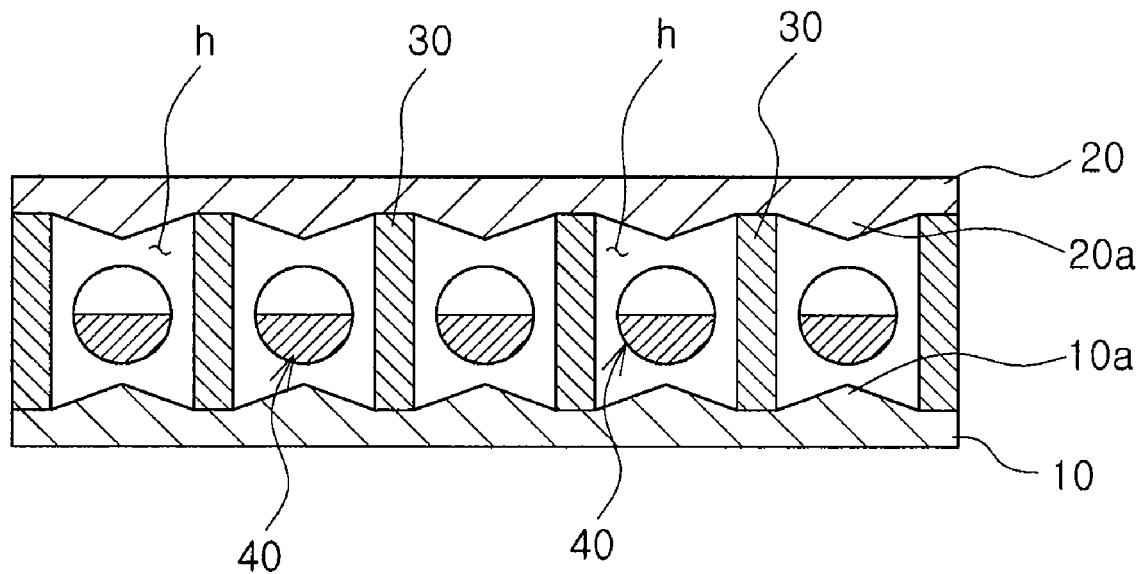

FIGS. 4A through 4C are cross-sectional views illustrating manufacturing processes of an electronic paper display device according to an exemplary embodiment of the invention.

First of all, as shown in FIG. 4A, a first electrode 10 having a first ridge portion 10a is prepared. The first ridge portion 10a may be formed of the same material as that of the first electrode 10.

More specifically, an electrode material may be used to form the first electrode as a sheet having a predetermined thickness, and a patterning process may be performed to form the first ridge portion. The patterning process may be, but is not particularly limited to, a laser patterning process, a photolithography process, an etching process, a sand blasting process, or the like.

Also, although not shown, the first ridge portion may be formed on the first electrode by the use of a dielectric material. The first electrode may be formed as a sheet and a dielectric layer having a predetermined thickness may be formed on the first electrode, and then the first ridge portion formed of a dielectric material may be formed by a patterning process.

Then, as shown in FIG. 4B, a space on the first electrode 10 is divided into a plurality of cell spaces h by partitions 30. The partition 30 may be formed of a thermosetting resin or a UV-curable resin. A resin layer may be formed to have a predetermined thickness, and a patterning process may be performed to form the partition.

For example, an imprinting method may be used. More specifically, after a resin layer is formed to have a predetermined thickness, the resin layer is squeezed with a stamp having embossed and depressed patterns, thereby forming a plurality of partitions. According to the embossed and depressed patterns of the stamp, the partitions and the cell spaces divided by the partitions are formed. Here, the embossed and depressed patterns may be adjusted to thereby adjust the gaps between the partitions and the shapes and sizes of the cell spaces.

Next, as shown in FIG. 4C, the plurality of cell spaces h formed on the first electrode 10 have rotatable balls 40 having electrical and optical anisotropy disposed therein, respectively. The rotatable balls 40 may be disposed within the cell spaces h by the use of a squeegee.

Then, a second electrode 20 having a second ridge portion 20a is attached in a manner such that the second electrode 20 faces the first electrode 10 and covers the cell spaces h.

The second ridge portion 20a may be formed of the same material as that of the second electrode 20.

Also, although not shown, the second ridge portion may be formed on the second electrode by the use of a dielectric material.

As set forth above, according to exemplary embodiments of the invention, an electronic paper display device includes a ridge portion causing an electric field to be streamlined in a cell space having a rotatable ball disposed therein. When the rotatable ball moves toward a partition, the streamlined electric field formed by the ridge portion causes the rotatable ball to move back toward the center of the cell space, so that the rotatable ball does not move toward the partition, but performs a linear movement within the center of the cell space.

Accordingly, an image charge is not formed in the partition, and the factor impairing the movements of the rotatable ball is removed, whereby an image displayed on the electronic paper display device is stabilized.

Also, the angle of incident light is varied due to the ridge portion so that a contrast ratio of the electronic paper display device is improved.

While the present invention has been shown and described in connection with the exemplary embodiments, it will be apparent to those skilled in the art that modifications and variations can be made without departing from the spirit and scope of the invention as defined by the appended claims.

What is claimed is:

1. An electronic paper display device comprising:
    first and second electrodes facing each other with a predetermined gap therebetween;
    partitions dividing a space between the first and second electrodes into a plurality of cell spaces;
    first and second ridge portions formed on the first and second electrodes and allowing for a streamlined electric field in the cell spaces; and
    rotatable balls disposed in the respective cell spaces and having electrical and optical anisotropy.

2. The electronic paper display device of claim 1, wherein at least one of the first and second ridge portions is formed of the same material as that of the first and second electrodes.

3. The electronic paper display device of claim 1, wherein at least one of the first and second ridge portions has a shape of a horn or a pillar.

4. The electronic paper display device of claim 1, wherein the rotatable balls are differently colored and include two display areas having different electrical charge properties.

5. The electronic paper display device of claim 1, wherein the rotatable balls have a shape of a sphere, an oval-shaped sphere or a cylinder.

6. The electronic paper display device of claim 1, wherein at least one of the first and second ridge portions is formed of a dielectric material.

7. The electronic paper display device of claim 6, wherein the cell spaces are filled with dielectric liquid, and
    the dielectric material has a higher dielectric constant than that of the dielectric liquid.

8. A method of manufacturing an electronic paper display device, the method comprising:
    preparing a first electrode having a first ridge portion;
    forming partitions dividing a space on the first electrode into a plurality of cell spaces;
    disposing rotatable balls in the respective cell spaces, the rotatable balls having electrical and optical anisotropy; and
    attaching a second electrode having a second ridge portion to be disposed to face the first electrode and cover the cell spaces.

9. The method of claim 8, wherein at least one of the first and second ridge portions is formed of the same material as that of the first and second electrodes.

10. The method of claim 8, wherein at least one of the first and second ridge portions is formed of a dielectric material.

11. The method of claim 8, wherein at least one of the first and second ridge portions has a shape of a horn or a pillar.

* * * * *